United States Patent
Kwon et al.

(10) Patent No.: US 12,548,754 B2
(45) Date of Patent: Feb. 10, 2026

(54) METHOD FOR MANUFACTURING ELECTRODE FOR ALL-SOLID-STATE BATTERY, AND ELECTRODE MANUFACTURED THEREBY

(71) Applicant: LG ENERGY SOLUTION, LTD., Seoul (KR)

(72) Inventors: Hyejin Kwon, Daejeon (KR); Sohee Kim, Daejeon (KR); Jeonggil Kim, Daejeon (KR); Taegon Kim, Daejeon (KR); Ki Tae Kim, Daejeon (KR); Choonghyeon Lee, Daejeon (KR); Myeongsoo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 59 days.

(21) Appl. No.: 18/567,745

(22) PCT Filed: Dec. 8, 2022

(86) PCT No.: PCT/KR2022/019920
§ 371 (c)(1),
(2) Date: Dec. 6, 2023

(87) PCT Pub. No.: WO2023/121074
PCT Pub. Date: Jun. 29, 2023

(65) Prior Publication Data
US 2024/0274781 A1    Aug. 15, 2024

(30) Foreign Application Priority Data
Dec. 23, 2021 (KR) .................. 10-2021-0185955

(51) Int. Cl.
H01M 4/04     (2006.01)
H01M 4/139    (2010.01)
(Continued)

(52) U.S. Cl.
CPC ....... *H01M 4/0416* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS 10,263,279 B2     4/2019  Yushin et al.
2006/0003226 A1*  1/2006  Sawa .................... H01M 4/134
                                                          429/188

(Continued)

FOREIGN PATENT DOCUMENTS

JP    2000077059 A     3/2000
JP    2004-306571 A   11/2004
(Continued)

*Primary Examiner* — Austin Murata
(74) *Attorney, Agent, or Firm* — Bryan Cave Leighton Paisner LLP

(57) ABSTRACT

A method for manufacturing an electrode for an all-solid-state battery is provided. The method comprises steps of applying granules containing an active material on a current collector, aligning and fixing the granules, applying a solid electrolyte solution on the granules, and moving the solid electrolyte solution into pores between the granules by reducing the pressure by vacuum at 20° C. to 40° C.

9 Claims, 1 Drawing Sheet

(51) Int. Cl.
*H01M 4/62* (2006.01)
*H01M 4/02* (2006.01)

(52) U.S. Cl.
CPC ............ *H01M 4/139* (2013.01); *H01M 4/62* (2013.01); *H01M 2004/021* (2013.01); *H01M 2300/0065* (2013.01)

(56) References Cited

U.S. PATENT DOCUMENTS

| | | |
|---|---|---|
| 2008/0305394 A1 | 12/2008 | Hisamitsu et al. |
| 2013/0295451 A1 | 11/2013 | Miki |
| 2014/0170503 A1* | 6/2014 | Yushin ................ H01M 10/054 429/233 |
| 2020/0235404 A1 | 7/2020 | Nakano |
| 2020/0303778 A1 | 9/2020 | Nogami et al. |
| 2020/0321598 A1 | 10/2020 | Sung et al. |
| 2020/0321599 A1 | 10/2020 | Kim et al. |
| 2020/0343577 A1* | 10/2020 | Park ................ H01M 10/0567 |
| 2021/0249688 A1 | 8/2021 | Lee et al. |
| 2021/0344044 A1 | 11/2021 | Lee et al. |
| 2022/0158249 A1* | 5/2022 | Nogami ............ H01M 10/0585 |

FOREIGN PATENT DOCUMENTS

| | | |
|---|---|---|
| JP | 2009016340 A | 1/2009 |
| JP | 2014-154238 A | 8/2014 |
| KR | 10-2013-0107352 A | 10/2013 |
| KR | 10-1446677 B1 | 10/2014 |
| KR | 10-2018-0046574 A | 5/2018 |
| KR | 10-2018-0072944 A | 7/2018 |
| KR | 10-2018-0073442 A | 7/2018 |
| KR | 10-2019-0019860 A | 2/2019 |
| KR | 10-2019-0035579 A | 4/2019 |
| KR | 10-2020-0042344 A | 4/2020 |
| KR | 10-2020-0050694 A | 5/2020 |
| KR | 10-2020-0143270 A | 12/2020 |
| KR | 10-2021-0105505 A | 8/2021 |
| WO | 2019078130 A1 | 4/2019 |
| WO | 2020184340 A1 | 9/2020 |

* cited by examiner

[Figure 1]
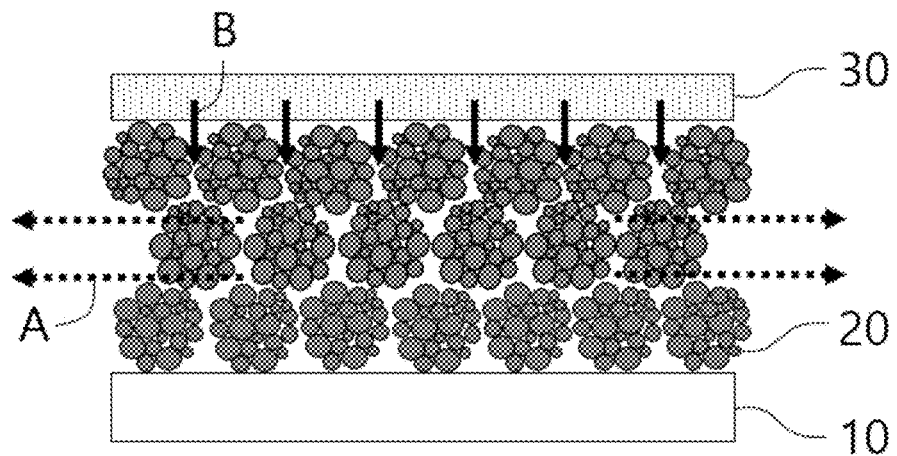
[Figure 2]
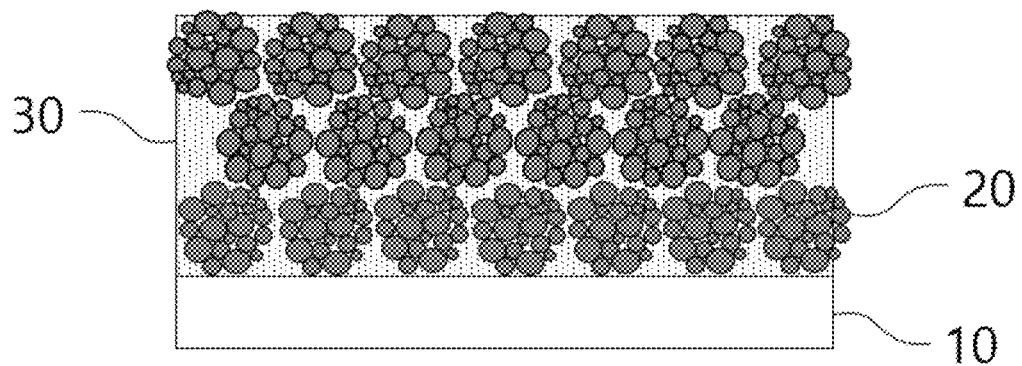

METHOD FOR MANUFACTURING ELECTRODE FOR ALL-SOLID-STATE BATTERY, AND ELECTRODE MANUFACTURED THEREBY

CROSS-REFERENCE TO RELATED APPLICATION (S)

This application is a National Stage Application of International Application No. PCT/KR2022/019920 filed on Dec. 8, 2022, which claims the benefit of priority based on Korean Patent Application No. 10-2021-0185955 filed on Dec. 23, 2021, the disclosures of which are incorporated herein by reference in their entirety.

FIELD

The present disclosure relates to a method for manufacturing an electrode for an all-solid-state battery and an electrode manufactured thereby. Specifically, the present disclosure relates to a method for manufacturing an electrode for an all-solid-state battery capable of effectively injecting a solid electrolyte solution into pores in a granule layer containing an active material, and an electrode manufactured thereby.

BACKGROUND

Various batteries that can overcome the limitations of the lithium secondary battery in terms of the capacity, safety, output, large size, and miniaturization of the battery are currently being studied.

Typically, continuous research is being conducted in academia and industry on a metal-air battery which have a very large theoretical capacity in terms of capacity compared to the lithium secondary batteries, an all-solid-state battery with no risk of explosion in terms of safety, a supercapacitor in terms of output, a NaS battery or redox flow battery (RFB) in terms of large size, a thin film battery in terms of miniaturization and the like.

Among them, the all-solid-state battery refers to a battery in which the liquid electrolyte used in the existing lithium secondary battery is replaced with a solid one, and since it does not use flammable solvents in the battery, and thus ignition or explosion due to the decomposition reaction of the conventional electrolyte solution does not occur at all, safety can be greatly improved. In addition, since Li metal or Li alloy can be used as a material for the negative electrode, there is an advantage that the energy density for the mass and volume of the battery can be dramatically improved.

Particularly, among solid electrolytes for the all-solid-state battery, inorganic solid electrolytes can be classified into sulfide-based and oxide-based. Currently, the most technologically developed solid electrolyte is a sulfide-based solid electrolyte, and as a material for this solid electrolyte, a material with an ion-conductivity close to that of an organic electrolyte solution has been developed.

Since the all-solid-state battery uses a solid electrolyte unlike the conventional lithium secondary battery that uses a liquid electrolyte solution, solid electrolytes cannot be easily penetrated to the pores of the electrode and thus problems such as physical contact may occur. As a solution to these problems, a method of mixing together granules containing an active material and a solid electrolyte in the liquid phase, and then solidifying it, and a method of preparing granules containing an active material to secure pores on the outside of the granules, and then injecting a solid electrolyte in the liquid phase into the pores first and then solidifying it, etc. were studied. In the case of the first method, it is difficult for the granules containing the active material to be effectively stacked on the current collector, resulting in a decrease in energy density, etc., and in the case of the second method, since the solid electrolyte in the liquid phase is not effectively injected into the pores and the entire electrode including the pores must be immersed in the solid electrolyte in the liquid phase, problems such as detachment of granules still need to be improved.

Accordingly, the inventors of the present disclosure have studied a method for more efficiently injecting the solid electrolyte in the liquid phase into the pores between the granules of the electrode in the manufacture of an electrode for an all-solid-state battery, and as a result, have completed the present disclosure.

RELATED ART

Korean Laid-open Patent Publication No. 10-2013-0107352

SUMMARY

The present disclosure is intended to provide a method for improving the performance of an electrode by effectively and uniformly injecting a solid electrolyte solution into pores in a granular layer containing an active material in the manufacturing method of an electrode for an all-solid-state battery.

According to the first aspect of the present disclosure, the present disclosure provides a method for manufacturing an electrode for an all-solid-state battery, the method comprising the steps of (1) applying granules containing an active material on a current collector, (2) aligning and fixing the granules applied on the current collector, (3) applying a solid electrolyte solution on the granules aligned and fixed on the current collector, and (4) moving the solid electrolyte solution applied on the granules into pores between the granules.

In one embodiment of the present disclosure, step (4) is performed under reduced pressure by vacuum at 20° C. to 40° C.

In one embodiment of the present disclosure, the granules are spherical particles having a diameter of 30 µm to 150 µm.

In one embodiment of the present disclosure, the granule layer composed of the granules fixed in step (2) has a porosity of 30% to 70%.

In one embodiment of the present disclosure, a granular layer composed of the granules fixed in step (2) has a thickness of 100 µm to 300 µm.

In one embodiment of the present disclosure, in step (3), the solid electrolyte solution is applied in an amount of 20% to 40% by volume based on the volume of the granule layer.

In one embodiment of the present disclosure, in step (3), the solid electrolyte solution is applied in an amount of 40% to 70% by volume based on the pore volume of the granular layer.

In one embodiment of the present disclosure, the solid electrolyte solution comprises 20% by weight to 40% by weight of solid components based on the total weight of the solid electrolyte solution.

In one embodiment of the present disclosure, step (4) is performed by repeating an operating period and a resting period of applying the vacuum at intervals of 5 to 15 seconds.

In one embodiment of the present disclosure, setting a cycle of the operating period and the resting period as one cycle, step (4) is performed by repeating 3 to 10 cycles.

In one embodiment of the present disclosure, the manufacturing method further comprises a step of (5) drying the result of step (4) under reduced pressure by vacuum at 60° C. to 80° C.

The manufacturing method of the electrode for the all-solid-state battery according to one embodiment of the present disclosure makes it possible to effectively and uniformly inject the solid electrolyte solution to the pores in the granule layer containing the active material formed on the current collector. Therefore, the electrode manufactured according to the manufacturing method can improve the performance of the all-solid-state battery.

BRIEF DESCRIPTION OF DRAWINGS

FIG. 1 is a diagram schematically showing a state after applying the solid electrolyte solution but before reducing the pressure by vacuum according to one embodiment of the present disclosure.

FIG. 2 is a view schematically showing a state in which the pressure is reduced by vacuum and then the solid electrolyte solution is injected into the pores between the granules according to one embodiment of the present disclosure.

DETAILED DESCRIPTION

The embodiments provided according to the present disclosure can all be achieved by the following description. The following description should be understood as describing preferred embodiments of the present disclosure, and it should be understood that the present disclosure is not necessarily limited thereto.

For the physical properties described herein, if the measurement conditions and methods are not specifically described, the physical properties are measured according to the measurement conditions and methods generally used by those skilled in the art.

One aspect of the present disclosure is to provide a method for manufacturing an electrode for an all-solid-state battery by injecting a solid electrolyte into a granule layer containing an active material formed on a current collector. According to one embodiment of the present disclosure, the manufacturing method of the electrode for all-solid-state battery comprises the steps of applying granules containing an active material on a current collector, aligning and fixing the applied granules, applying a solid electrolyte solution on the fixed granules, and allowing the applied solid electrolyte solution to move into the pores between the granules.

The active material is applied on the current collector in the form of granules. Since the all-solid-state battery uses a solid electrolyte, unlike conventional lithium secondary batteries that use a liquid electrolyte, the solid electrolyte cannot penetrate easily, and thus if the active material in the form of powder is used as it is, the utilization of the active material may be significantly reduced. If a physical contact is formed between the granules and the solid electrolyte by manufacturing the active material in the form of granules and thus forming a basic network inside the granules in order to increase the utilization of the active material, and then injecting a solid electrolyte into the pores enlarged through the formation of granules, the utilization of the active material can be significantly improved.

According to one embodiment of the present disclosure, the granules are spherical particles containing the active material, the electrically conductive material, and the binder. Here, the spherical shape does not mean a complete spherical shape in a strict sense, and generally the spherical particle is used as a comprehensive concept including round-shaped particles. The active materials, which are particulates in a powder state, are combined by a binder solution with an electrically conductive material to grow into particles with a specific range of specifications.

According to one embodiment of the present disclosure, the granules are spherical particles having a diameter of 30 µm to 150 µm. Here, since the spherical particle does not mean a perfect spherical particle, the diameter refers to the largest value among distances from an arbitrary point on the surface of the particle to a point on another surface. Specifically, the diameter of the granules may be 30 µm or more, 35 µm or more, 40 µm or more, 45 µm or more, or 50 µm or more, and 150 µm or less, 145 µm or less, 140 µm or less, 135 µm or less, 130 µm or less, 125 µm or less, or 120 µm or less, and may be 30 µm to 150 µm, 40 µm to 135 µm, or 50 µm to 120 µm. If the diameter of the granules is less than the above range, since the porosity in the granular layer is small, the amount of liquid solid electrolyte that penetrates and coats between granules is reduced, and thus as an all-solid-state battery, physical contact between the active material and the solid electrolyte may not be easy. If the diameter of the granules exceeds the above range, since the distance between the surface in contact with the solid electrolyte and the center of the granule is increased, the active materials contained in the granule may not be properly utilized.

The electrode for the all-solid-state battery according to an embodiment of the present disclosure may be any one of a negative electrode and a positive electrode, and more specifically, the electrode for the all-solid-state battery may be a positive electrode.

If the electrode is a negative electrode, the electrode active material contained in the granules is not particularly limited as long as it can be used as a negative electrode active material for a lithium-ion secondary battery. For example, the negative electrode active material may be one or more species selected from carbon such as non-graphitizable carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of groups 1, 2, and 3 of the periodic table, halogen; $0 < x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; an electrical conductivity polymer such as polyacetylene; Li—Co—Ni based material; titanium oxide; lithium titanium oxide. According to one embodiment of the present disclosure, the negative electrode active material may comprise a carbonaceous material and/or Si.

If the electrode is a positive electrode, the electrode active material contained in the granule is not particularly limited as long as it can be used as a positive electrode active material for a lithium-ion secondary battery. For example, the positive electrode active material may be a lithium transition metal oxide containing one or more transition metals. According to one embodiment of the present disclosure, the positive electrode active material is selected from the group consisting of $LiCoO_2$, $LiNiO_2$, $LiMnO_2$, $Li_2MnO_3$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0<y<1$), $LiCo_{1-y}Mn_yO_2$, $LiNi_{1-y}Mn_yO_2$ (0<y<1), $Li(Ni_aCo_bMn_c)O_4$ (0<a<2, 0<b<2, 0<c<2, a+b+c=2), $LiMn_{2-z}Ni_zO_4$ (0<z<2), $LiMn_{2-z}CO_zO_4$ (0<z<2) and a combination thereof.

The electrically conductive material contained in the granule is not particularly limited as long as it is located in the granule and can impart conductivity between the active material and the electrolyte. For example, the electrically conductive material may be nickel powder, cobalt oxide, titanium oxide, carbon, or the like, and the carbon may be any one selected from the group consisting of Ketjen black, acetylene black, furnace black, graphite, carbon fiber, and fullerene, or one or more types of these.

The binder comprised in the granules according to one embodiment of the present disclosure is mixed with the active material and the electrically conductive material, which are fine particles in a powder state, and binds the respective components to each other to help the growth of the particles. Among solid electrolytes, a sulfide-based solid electrolyte is sensitive to moisture, for example, if it comes into contact with moisture, it generates $H_2S$ gas, etc. and thus it is preferable to exclude moisture as much as possible from the time of forming the granules. According to one embodiment of the present disclosure, the binder is an organic binder. The organic binder means a binder that is dissolved or dispersed in an organic solvent, particularly N-methylpyrrolidone (NMP), and is distinguished from an aqueous binder using water as a solvent or dispersion medium. Specifically, the organic binder may be selected from the group consisting of polyvinylidene fluoride (PVDF), vinylidenfluoride-hexafluoropropylene copolymer (PVDF-co-HFP), polyvinyl alcohol, starch, hydroxypropylcellulose, regenerated cellulose, polyvinylpyrrolidone, polyimide, polyamideimide, polyethylene, polypropylene, ethylene-propylene-diene monomer (EPDM), sulfonated EPDM, styrene butadiene rubber, and fluorine rubber, but is not limited thereto.

According to one embodiment of the present disclosure, the content of the active material in the granules is 85% by weight to 99.8% by weight, specifically 88% by weight to 99.5% by weight, more specifically 90% by weight to 99.3% by weight, and the content of the binder is 0.1% by weight to 10% by weight, specifically 0.2% by weight to 8% by weight, more specifically 0.3% by weight to 7% by weight, and the content of the electrically conductive material is 0.1% by weight to 10% by weight, specifically 0.2% by weight to 8% by weight, more specifically 0.3% by weight to 7% by weight. When the contents of the active material, the binder, and the electrically conductive material are adjusted within the above-mentioned ranges, it may be advantageous to improve the performance of the battery.

According to one embodiment of the present disclosure, the granules have a porosity of 10% to 40%. The porosity of the granules means a volume ratio of pores in the granules, and the porosity may be measured, for example, by a BET (Brunauer-Emmett-Teller) measurement method or a mercury penetration method (Hg porosimeter), but is not limited thereto. As another example, the porosity can be calculated using other parameters such as the size, the thickness, and the density. Specifically, the porosity of the granules may be 10% or more, 15% or more, 20% or more, 25% or more, and 40% or less, 35% or less, 30% or less, and may be 10% to 40%, 15% to 35%, or 25% to 30%. If the porosity of the granules is less than the above range, since the solid electrolyte is difficult to come into close contact with the granules, the performance improvement of the battery may not be evident. If the porosity of the granules exceeds the above range, since the amount of the active material is reduced compared to the volume of the granules, the performance improvement of the battery may not be evident, in that it is difficult to provide the electrode highly loaded with the active material.

The granules may be prepared by a method generally used in the art, and there is no particular limitation. When preparing the granules, the binder solution is added together with the active material and the electrically conductive material of the particulates in powder state to grow the particle size of the granules to a specific level. As the solvent is dried in the formed granules, the binder and the electrically conductive material, which are relatively light in weight, are positioned outside the granules, so that the density of the outside of the granules can be increased.

According to one embodiment of the present disclosure, in order to prepare an electrode for an all-solid-state battery, first, granules comprising the active material are applied on the current collector and then the applied granules are aligned and fixed. As the applying method, a method commonly used in the art is used, and is not particularly limited. The composition of the granules can follow the above description and can determine the amount of applying of granules in consideration of the performance and specific application of the battery. The applied granules can be in a disordered form, and the layer of the applied granules may form irregular surface and pores. It is possible to reduce the irregularity of the surface and pores of the layer by aligning irregularly applied granules. If the surface and pore irregularities are reduced, it is more advantageous to impregnate and coat the solid electrolyte solution afterwards, and the performance of the battery can be realized more stably. Thereafter, the aligned granules are fixed to improve the durability of the electrode. If only the aligning process is performed without the process of fixing the granules, the granules introduced onto the current collector can be easily detached during the additional manufacturing process or operation of the battery. In order to prevent detaching phenomenon of these granules, a process of fixing the granules is required. The method of aligning and fixing the granules is performed by a method commonly used in the art, and is not particularly limited. In general, a roll may be used in the process of aligning and fixing, and in the process of fixing, it can be fixed by the binder or the like inside the granules by heating and cooling the granules.

The layer formed by aligning and fixing the applied granules according to the above description is referred to as a granule layer or an electrode active material layer in this specification. According to one embodiment of the present disclosure, the granule layer has a thickness of 100 μm to 300 μm. Here, the thickness means the vertical distance between the current collector and the surface of the granule farthest from the current collector. Since the granules are in an aligned and fixed state, most of the granules located on the surface of the granule layer are located at a similar distance from the current collector. Specifically, the thickness of the electrode active material layer may be 100 μm or more, 110 μm or more, 120 μm or more, 130 μm or more, 140 μm or more, or 150 μm or more, and 300 μm or less, 290 μm or less, 280 μm or less, 270 μm or less, 260 μm or less, or 250 μm or less, and may be 100 μm to 300 μm, 120 μm to 270 μm, or 150 μm to 250 μm. If the thickness of the electrode active material layer is less than the above range, the loading amount of the active material is reduced, so that the performance of the battery may not be clearly improved. If the thickness of the electrode active material layer exceeds the above range, the electrode may become too thick and the utilization of the active material in the electrode may be reduced.

According to one embodiment of the present disclosure, the granule layer has a porosity of 30% to 70%. The porosity of the granule layer means a volume ratio of pores in the granule layer, and the porosity may be measured, for example, by a BET (Brunauer-Emmett-Teller) measurement method or a mercury penetration method (Hg porosimeter), but is not limited thereto. As another example, the porosity can be calculated using other parameters such as the size, the thickness, and the density. Specifically, the porosity of the granule layer may be 30% or more, 33% or more, 36% or more, 39% or more, 42% or more, 45% or more, and 70% or less, 67% or less, 64% or less, 61% or less, 58% or less, or 55% or less, and may be 30% to 70%, 36% to 61%, or 45% to 55%. If the porosity of the granule layer is less than the above range, it is not easy to introduce a solid electrolyte solution. If the porosity of the granule layer exceeds the above range, the electrode may become too thick, which may be undesirable.

A solid electrolyte solution is applied on the granule layer formed by fixing the granules. Even if pores exist in the granule layer, since the gas in the pores cannot be easily discharged to the outside, the solid electrolyte solution applied on the granule layer does not actively permeate into the pores of the granule layer. The solid electrolyte may be a polymer solid electrolyte formed by adding a polymer resin to a solvated lithium salt, or may be a polymer gel electrolyte formed by incorporating an organic electrolyte solution containing an organic solvent and a lithium salt, an ionic liquid, a monomer, or an oligomer, and the like into a polymer resin. The solid electrolyte may be at least one species selected from a polymer-based solid electrolyte, a sulfide-based solid electrolyte, and an oxide-based solid electrolyte. According to one embodiment of the present disclosure, the solid electrolyte is a sulfide-based solid electrolyte.

The solid electrolyte solution may be in a state in which fluidity is imparted to the solid electrolyte by mixing water or an organic solvent with the above-described solid electrolyte, wherein the water or organic solvent may be dried to remove some or all of it. According to one embodiment of the present disclosure, the solid electrolyte solution contains 20% by weight to 40% by weight of solid components based on the total weight of the solid electrolyte solution. Here, the solid components mean components remaining after completely drying to remove components such as water or organic solvent. The content of the solid component may affect the operation conditions such as the vacuum to be described later. Specifically, the content of the solid component may be 20% by weight or more, 21% by weight or more, 22% by weight or more, 23% by weight or more, 24% by weight or more, or 25% by weight or more, and 40% by weight or less, 39% by weight or less, 38% by weight or less, 37% by weight or less, 36% by weight or less, or 35% by weight or less, and may be 20% by weight to 40% by weight, 22% by weight to 37% by weight, or 25% by weight to 35% by weight. If the content of the solid component is less than the above range, the content of the solid electrolyte with functionality may be too small. If the content of the solid component exceeds the above range, the fluidity of the solid electrolyte solution may be significantly decreased.

According to one embodiment of the present disclosure, the lithium salt is an ionizable lithium salt, which may be expressed as $Li^+X^-$. The anion of the lithium salt is not particularly limited, but $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(C_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and the like can be exemplified. In one embodiment of the present disclosure, the sulfide-based solid electrolyte contains sulfur (S) and has ionic conductivity of a metal belonging to group 1 or group 2 of the periodic table, which may comprise Li—P—S-based glass or Li—P—S-based glass ceramics. Non-limiting examples of such a sulfide-based solid electrolyte may be $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$LiCl$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiSe$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$ and the like, and may comprise one or more of these.

In order to help understanding the present disclosure, FIG. 1 schematically shows a state after applying the solid electrolyte solution but before reducing the pressure by vacuum according to one embodiment of the present disclosure. As shown in FIG. 1, a granule layer composed of granules 20 is formed on the current collector 10, and a solid electrolyte solution 30 is applied on the granule layer. Since the solid electrolyte solution 30 contains a liquid phase having fluidity, some of it may permeate into the pores between the granule layers, but in FIG. 1, the granule layer and the solid electrolyte solution 30 are shown as one separate layer to clearly distinguish them. The solid electrolyte solution 30 may be adjusted considering the volume of the granule layer and the volume of pores in the granule layer.

According to one embodiment of the present disclosure, the solid electrolyte solution is applied in an amount of 20% by volume to 40% by volume based on the volume of the granule layer. Here, the volume of the granule layer is the value obtained by multiplying the thickness of the granule layer by the surface area of the current collector on which the granules are applied, and the volume of the solid electrolyte solution is measured in advance before applying. The applied amount of the solid electrolyte solution may be 20% by volume or more, 21% by volume or more, 22% by volume or more, 23% by volume or more, 24% by volume or more, or 25% by volume or more, and 40% by volume or less, 39% by volume or less, 38% by volume or less, 37% by volume or less, 36% by volume or less, or 35% by volume or less, and may be 20% by volume to 40% by volume, 23% by volume to 37% by volume, or 25% by volume to 35% by volume. If the applied amount of the solid electrolyte solution is less than the above range, it may be difficult to evenly disperse in the pores due to insufficient amount of the solid electrolyte solution. If the applied amount of the solid electrolyte solution exceeds the above range, even though the solid electrolyte solution is injected in an amount sufficient to completely fill the pores, the injection efficiency of the solid electrolyte solution into the pores may be decreased.

According to one embodiment of the present disclosure, the solid electrolyte solution is applied in an amount of 40% by volume to 70% by volume based on the pore volume of the granule layer. Here, the volume of pores in the granule layer is calculated in consideration of the volume and porosity of the granule layer described above. It may be desirable to coat the solid electrolyte solution in an appropriate amount so that it can be uniformly distributed in the pores after injection into the pores of the granule layer. The applied amount of the solid electrolyte solution may be 40% by volume or more, 41% by volume or more, 42% by volume or more, 43% by volume or more, 44% by volume or more, or 45% by volume or more, and 70% by volume or less, 68% by volume or less, 66% by volume or less, 64% by volume or less, 62% by volume or less, or 60% by volume or less, and may be 40% by volume to 70% by volume, 42% by volume to 64% by volume, or 45% by volume to 60% by volume. If the applied amount of the solid electrolyte solution is less than the above range, it may be difficult to evenly disperse in the pores due to insufficient amount of the solid electrolyte solution. If the applied amount of the solid electrolyte solution exceeds the above range, the injection efficiency of the solid electrolyte solution into the pores may be decreased. Even if the solid electrolyte solution does not completely fill the pores of the granule layer, the solid electrolyte solution is located in contact with the granule due to the attraction between the granule and the solid electrolyte, and thus the physical contact between the granule and the solid electrolyte can be improved.

The solid electrolyte solution applied on the granule layer is moved to the pores between the granules, that is, to the pores within the granule layer, by reducing the pressure by vacuum. As shown in FIG. 1, when the solid electrolyte solution is applied on the granule layer and the pressure is reduced by vacuum, the gas in the pores escapes from the pores in the A direction, and the solid electrolyte solution is injected into the pore by gravity in the B direction. In order to help understand the present disclosure, FIG. 2 schematically shows a state in which the pressure is reduced by vacuum and then the solid electrolyte solution is injected into the pores between the granules according to one embodiment of the present disclosure. As shown in FIG. 2, even in the state where the solid electrolyte solution is injected to be in contact with the current collector, the solid electrolyte solution can be partially exposed on the surface of the granule layer.

According to one embodiment of the present disclosure, the vacuum reduction is performed at a temperature of 20° C. to 40° C. During the reduction of the pressure by vacuum, the temperature can be controlled such that the solid electrolyte solution is not too dry due to the reduction of the pressure by vacuum, while imparting fluidity to the solid electrolyte solution. Specifically, the temperature may be 20° C. or higher, 21° C. or higher, 22° C. or higher, 23° C. or higher, 24° C. or higher, or 25° C. or higher, and 40° C. or lower, 39° C. or lower, 38° C. or lower, 37° C. or lower, 36° C. or lower, or 35° C. or lower, and may be 20° C. to 40° C., 22° C. to 37° C., or 25° C. to 35° C. During the reduction of the pressure by vacuum, if the temperature is below the above range, the fluidity of the solid electrolyte solution is reduced, and thus it is not easy to inject the solid electrolyte solution into the pores, and if the temperature exceeds the above range, the amount of solid electrolyte solution to be dried is increased, which may be undesirable.

The reduction of the pressure by vacuum may be performed by injecting an electrode applied with a solid electrolyte solution on the granule layer in a vacuum device, and the vacuum device is not particularly limited as long as it is generally used in the related art. According to one embodiment of the present disclosure, the reduction of the pressure by vacuum is performed by repeating an operating period and a resting period of the vacuum at intervals of 5 to 15 seconds. Since the solid electrolyte solution is not a single component as described above and comprises solid components and solvents, if the reduction of the pressure by vacuum is performed at once, there may be an imbalance problem in the solid electrolyte solution and there may be a problem that the amount of injection of the continuous solution is large and thus the granules of the granule layer are detached. However, if the resting period is taken too long, the flowability of the solution penetrating into the inside may be lowered, and thus there may be a problem that the final permeation volume of the solution is reduced. Therefore, in the case of having an appropriate resting period, the problems such as imbalance in the solid electrolyte solution and detachment of granules can be solved, and the efficiency of the reduction of the pressure by vacuum can be also increased overall. Specifically, the interval may be 5 seconds or more, 6 seconds or more, 7 seconds or more, and 15 seconds or less, 14 seconds or less, or 13 seconds or less, and may be 5 seconds to 15 seconds, 6 seconds to 14 seconds, or 7 seconds to 13 seconds. If the interval is less than the above range, the vacuum time for one time is too short to effectively inject the solid electrolyte solution into the pores. If the interval exceeds the above range, the effect obtained by separating the operating period and the resting period is insignificant. According to one embodiment of the present disclosure, when taking the period from the operating period to the resting period as one cycle, the reduction of the pressure by vacuum is performed by repeating 3 cycles to 10 cycles, 3 cycles to 9 cycles, and 3 cycles to 8 cycles. Within the cycle range, the solid electrolyte solution can be completely injected into the pores of the granule layer.

As shown in FIG. 2, the solid electrolyte solution is completely injected into the pores of the granule layer, and then it can be heated and dried under vacuum. The drying is a process of removing some or all of liquid components such as the solvent from the solid electrolyte solution. Since the solid electrolyte solution is in the injected state in the pores, it may not be completely dried even through a high-temperature vacuum drying process. However, when the drying process is performed, no liquid is exuded to the outside of the electrode at room temperature after drying, and in that sense, this battery can also be sufficiently interpreted as an all-solid-state battery. According to one embodiment of the present disclosure, the drying process is performed by reducing the pressure by vacuum at 60° C. to 80° C. Unlike the injection of the solid electrolyte solution into the pores of the granule layer, it is not carried out separately into an operating period and a resting period, but can be carried out through one operating period. Specifically, the temperature may be 60° C. or higher, 61° C. or higher, 62° C. or higher, 63° C. or higher, 64° C. or higher, 65° C. or higher, and 80° C. or less, 79° C. or less, 78° C. or less, 77° C. or less, 76° C. or less, or 75° C. or less, and may be 60° C. to 80° C., 62° C. to 77° C., or 65° C. to 75° C. If the temperature during drying is less than the above range, drying is not easy. If the temperature during drying exceeds the above range, this may be undesirable that the additional drying effect is not only negligible, but also can modify the structure of the granule layer.

According to one embodiment of the present disclosure, the electrode active material layer containing the solid electrolyte in the electrode for the all-solid-state battery after drying contains 20% by weight to 40% by weight of the solid electrolyte based on the content of the granules. Specifically, the content of the solid electrolyte may be 20% by weight or more, 21% by weight or more, 22% by weight or more, 23% by weight or more, 24% by weight or more, 25% by weight or more, and 40% by weight or less, 39% by weight or less, 38% by weight or less, 37% by weight or less, 36% by weight or less, 35% by weight or less, and may be 20% by weight to 40% by weight, 22% by weight to 37% by weight, or 25% by weight to 35% by weight. If the content of the solid electrolyte is less than the above range, as an all-solid-state battery, electron movement between the electrolyte and the active material is not easy, and thus the performance improvement of the battery may not appear clearly. If the content of the solid electrolyte exceeds the above range, the loading amount of the active material is relatively reduced, and thus the performance improvement of the battery may not appear clearly.

In one aspect of the present disclosure, the present disclosure provides an all-solid-state battery comprising an electrode for the above-described all-solid-state battery as a positive electrode and/or a negative electrode. In configuring the all-solid-state battery, a separate solid electrolyte layer may be introduced between the positive electrode and the negative electrode in addition to the solid electrolyte comprised in the electrode, and this solid electrolyte layer can play the same role as a separator in a general lithium secondary battery at the same time. In some cases, the above-described electrode can be used as a semi-solid battery by using a liquid electrolyte together, and in this case, a separate polymer separator may be further required.

The polymer separator is interposed between the negative electrode and the positive electrode, which serves to electrically insulate the negative electrode and the positive electrode while allowing lithium ions to pass therethrough. The polymer separator may be any one used as a polymer separator membrane used in the field of general all-solid-state batteries and is not particularly limited.

In one aspect of the present disclosure, the present disclosure provides a battery module comprising the all-solid-state battery as a unit battery, a battery pack comprising the battery module, and a device comprising the battery pack as a power source.

Specific examples of the device may comprise, but are not limited to, a power tool that is powered by an electric motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (E-scooter); an electric golf cart; and a power storage system.

Hereinafter, preferred embodiments are presented to help understand the present disclosure, but the following examples are provided to more easily understand the present disclosure, but the present disclosure is not limited thereto.

EXAMPLES AND COMPARATIVE EXAMPLES

Example 1

$LiNi_{0.6}Co_{0.2}Mn_{0.2}O_2$ (NCM 622) as an active material, carbon black as an electrically conductive material, and polyvinylidene fluoride (PVDF) as a binder were mixed in a weight ratio of 94:3:3 (active material:electrically conductive material:binder) in N-methylpyrrolidone solvent to prepare a slurry, and then granules having a diameter of about 60 μm (porosity: about 30%) were prepared by spray drying.

Meanwhile, the previously prepared granules were applied on an aluminum current collector of about 100 μm. After introducing the upper roll on top of the granule layer and the lower roll on the bottom of the current collector, the distance between the centers of the upper and lower rolls was adjusted to about 300 μm. At this time, the upper roll and the lower roll are in a normal temperature state without particularly applying heat, and the upper and lower rolls were moved left and right evenly and slowly to align the granules. Thereafter, the temperature of the upper and lower rolls was raised to about 40° C. and then the granules were fixed by slowly moving them left and right in the same manner. The energy density of the fixed granule layer was about 4 mAh/cm$^2$ and the porosity was about 55%. Here, the porosity of the granule layer was calculated by measuring the thickness of the granule layer through an equipment for measuring the thickness of the material (TESA, u-hite), and then using the true density of the granule layer measured through an equipment for measuring the true density of the material (Microtrac, BELPycno).

After applying a solid electrolyte solution of about 60% by volume (based on the granule layer: about 27%, based on pores in the granule layer: about 49%) based on the volume of the granule on the granule layer prepared according to the above description, it was placed in a device for the reduction of the pressure by vacuum (manufacturer: AIRZERO, product name: AZC-050), and then, an operating period and a resting period were repeated 5 cycles at room temperature at intervals of about 10 seconds to inject the solid electrolyte solution into the pores of the granule layer. Thereafter, the inside of the device for the reduction of the pressure by vacuum was heated to about 70° C. and then dried for about 10 minutes to prepare a positive electrode for an all-solid-state battery.

Additionally, a slurry was prepared by mixing $Li_2S$—$LiCl$—$P_2S_5$ with a polyvinylidene fluoride (PVDF) solution (solution in which PVDF and toluene are mixed at a weight ratio of 8:92), and then applied on a lithium foil (Li foil) having a thickness of about 150 μm to a thickness of about 50 μm to manufacture a solid electrolyte and a negative electrode comprising the same. The positive electrode and the negative electrode were stacked and compressed to manufacture an electrode assembly, and then, it was placed inside the battery case to manufacture an all-solid-state battery.

Comparative Example 1

An all-solid-state battery was manufactured in the same way as in Example 1, except that the solid electrolyte solution is adjusted in an amount of about 30% by volume (based on the granule layer: about 13.5%, based on pores in the granule layer: about 24.6%) based on the volume of the granules on the prepared granule layer.

Comparative Example 2

An all-solid-state battery was manufactured in the same way as in Example 1, except that the solid electrolyte solution is adjusted in an amount of about 90% by volume (based on the granule layer: about 40.5%, based on pores in the granule layer: about 73.8%) based on the volume of the granules on the prepared granule layer.

Comparative Example 3

An all-solid-state battery was manufactured in the same way as in Example 1, except that the device of the reduction of the pressure by vacuum was operated for 50 seconds without a resting period to inject the solid electrolyte solution into the pores of the granule layer.

Experimental Example: Evaluation of Performance of Manufactured Battery

The batteries manufactured in Example 1 and Comparative Examples 1 to 3 were charged/discharged to measure the discharging capacity (mAh/g) and coulombic efficiency (%) in the first cycle, and the results are shown in Table 1. On the other hand, when evaluating the performance of the battery, the discharging capacity (mAh/g) and coulombic efficiency (%) were measured by performing charging/discharging at a temperature of 60° C. under the following conditions.

Charging condition: 0.05 C, 4.25V CC/CV, 0.01 C cut-off
Discharging condition: 0.05 C, 3V
The results are shown in Table 1 below.

TABLE 1

| | Coulombic efficiency (%) | Discharging capacity (mAh/g) |
|---|---|---|
| Example 1 | 90 | 101 |
| Comparative Example 1 | 57 | 75 |
| Comparative Example 2 | 76 | 88 |
| Comparative Example 3 | — (detachment of electrode during manufacturing) | — (detachment of electrode during manufacturing) |

According to Table 1, the all-solid-state battery of Example 1 showed superior effects in terms of initial coulombic efficiency and discharging capacity compared to the all-solid-state batteries of Comparative Examples 1 and 2. This means that even though the solid electrolyte solution was injected using the same vacuum method, the degree of injection of the solid electrolyte solution in the pores may vary depending on the amount of the solid electrolyte solution initially applied. In the case of Comparative Example 1, it is expected that the coulombic efficiency and discharge capacity are reduced because the amount of solid electrolyte solution injected into the pores is small. On the other hand, in the case of Comparative Example 2, even though a sufficient amount of solid electrolyte solution was injected than in Example 1, the coulombic efficiency and discharge capacity were lower than those of Example 1. This means that a large amount of solid electrolyte solution is not necessarily required to achieve high coulombic efficiency and discharging capacity. In the case of Comparative Example 2, it is expected that the initial performance of the battery is degraded because the solid electrolyte solution is not uniformly impregnated into the pores even though the amount of the solid electrolyte solution is sufficiently large.

On the other hand, in introducing the solid electrolyte solution in a vacuum method, when comparing Example 1 and Comparative Example 3, it can be seen that the resting period is important. Specifically, in the case of Comparative Example 3, since a large amount of solid electrolyte solution is continuously injected into the pores at once by introducing the vacuum method at once without giving the resting period, without time for the solid electrolyte solution to be naturally rearranged in the pores, the structure of the granule layer was collapsed and the electrode was detached.

All simple modifications or changes of the present disclosure belong to the scope of the present disclosure, and the specific protection scope of the present disclosure will be clarified by the appended claims.

DESCRIPTION OF REFERENCE NUMERALS

10: Current collector
20: Granules containing the active material
30: Solid electrolyte solution
A: Flow of gas in the pores by vacuum
B: Flow of solid electrolyte solution by vacuum

What is claimed is:

1. A method of manufacturing an electrode for an all-solid-state battery, the method comprising the steps of:
   (1) applying granules containing an active material on a current collector;
   (2) aligning and fixing the granules applied on the current collector to form a granule layer;
   (3) applying a solid electrolyte solution on the granules aligned and fixed on the current collector; and
   (4) moving the solid electrolyte solution applied on the granules into pores between the granules,
   wherein in step (3), the solid electrolyte solution is applied in an amount of 20% by volume to 40% by volume based on the volume of the granule layer, and
   wherein step (4) is carried out by reducing the pressure by vacuum at 20° C. to 40° C.

2. The method according to claim 1, wherein the granules are spherical particles having a diameter of 30 μm to 150 μm.

3. The method according to claim 1, wherein the granule layer is composed of the granules fixed in step (2) has a porosity of 30% to 70%.

4. The method according to claim 1, wherein the granule layer is composed of the granules fixed in step (2) has a thickness of 100 μm to 300 μm.

5. The method according to claim 3, wherein in step (3), the solid electrolyte solution is applied in an amount of 40% by volume to 70% by volume based on the pore volume of the granule layer.

6. The method according to claim 1, wherein the solid electrolyte solution contains 20% by weight to 40% by weight of solid components based on the total weight of the solid electrolyte solution.

7. The method according to claim 1, wherein step (4) is performed by repeating an operating period and a resting period of applying the vacuum at intervals of 5 to 15 seconds.

8. The method according to claim 7, wherein a cycle of the operating period and the resting period is set as one cycle, and step (4) is performed by repeating 3 to 10 cycles.

9. The method according to claim 1, wherein the method further comprises a step of (5) drying the result of step (4) under reduced pressure by vacuum at 60° C. to 80° C.

* * * * *